Aug. 18, 1970  REI YOKOUCHI ET AL  3,524,730
APPARATUS FOR CARRYING OUT A POLYCONDENSATION
REACTION CONTINUOUSLY
Filed Nov. 21, 1967   3 Sheets-Sheet 1

# United States Patent Office 3,524,730
Patented Aug. 18, 1970

3,524,730
APPARATUS FOR CARRYING OUT A POLYCONDENSATION REACTION CONTINUOUSLY
Rei Yokouchi Yoshio Takehisa, and Ko Yuge, Mishima-shi, and Naoyuki Mitani, Ohtsu-shi, Japan, assignors to Toray Industries, Inc., Tokyo, Japan, a corporation of Japan
Continuation-in-part of application Ser. No. 419,912, Dec. 21, 1964. This application Nov. 21, 1967, Ser. No. 684,746
Claims priority, application Japan, Dec. 26, 1963, 38/69,789
Int. Cl. B01j 3/02
U.S. Cl. 23—285             6 Claims

ABSTRACT OF THE DISCLOSURE

Apparatus for continuous production of polycondensation products of high viscosity, which comprises a horizontal reaction tank provided with an inlet near each end and an outlet near the middle of the tank and a suction port for the removal of by-products, at least one shaft carrying means for conveying reaction components from the inlets to the outlet while agitating the reaction components, said shaft being mounted in the tank so as to provide substantial clearance between the inner surface of the tank and said means over at least a portion of the tank where said suction port is located.

---

This application is a continuation-in-part of the applicants' copending application Ser. No. 419,912, filed Dec. 21, 1964 and now abandoned.

This invention relates to an apparatus for continuously carrying out polymerization reactions such as condensation polymerizations.

In carrying out continuous polycondensation reactions for producing linear terephthalate polyesters such as polyethylene terephthalate, two reactors are used, an early stage polymerization apparatus and a later stage polymerization apparatus. In the early stage polymerization apparatus, bis-2-hydroxyethyl terephthalate or its low polycondensed products formed by either the esterification reaction of ethylene glycol and terephthalic acid or the ester-interchange reaction between ethylene glycol and dimethyl terephthalate, or the mixtures thereof are polymerized for a prescribed period of time under a reduced pressure at a required temperature, following which the reaction mixture is conveyed to the later stage polymerization apparatus to be polymerized for a prescribed period of time under conditions of a still lower pressure and a higher temperature, thereby yielding the polyethylene terephthalate. In a continuous operation, it is preferred that the flow of the reactants in both polymerization apparatuses is piston-like. If reverse mixing should occur in the flow through the apparatus or if there are places in the apparatus where stagnation takes place, it becomes impossible to continuously obtain products of uniform quality.

Since the viscosity of the reactants in the early stage polymerization apparatus for producing polyethylene terephthalate is less than 100 poises, the designing of an apparatus in which there are no places where the reactants stagnate is simplified. The objective can be fully attained, for example, by such means as those in which a plurality of mixing tanks are disposed in series; a multistage, in-series reaction tank or a long and narrow, horizontal, cylindrical type reaction apparatus. By carrying out thorough agitation inside the reaction apparatus the places where stagnation might occur can be completely eliminated. On the other hand, in the later stage polymerization apparatus where the viscosity of the reactants exceeds 3000 poises, minor matters, which would not cause trouble in a reaction apparatus which handles reactants of lower viscosity, have a serious effect on the quality of the product.

The hitherto-proposed horizontal, later stage polymerization apparatus was usually provided with an inlet for feeding the starting material at one end of the apparatus and had an outlet at the other end for taking out the reaction product. The flow of the reactant inside the apparatus was in a single direction, and for that reason, there was a tendency for a part of the reactants to become congested particularly in the vicinity of the outlet. The stagnant reactants would either proceed too far in their polymerization or decompose and thus become degraded or discolored in their molten state or the stagnant reactants would solidify by being cooled, and would become mixed with the reactants due to mechanical shocks or the force of gravity, and hence causes discoloration or the inclusion of foreign matter in the product. In addition, in view of the high viscosity of the reactants it is difficult to effect their smooth movement to the outlet by means of the agitaing and advancing means, since a considerable amount will adhere to the shaft of the agitating and advancing means in the vicinity of the outlet. Since water is usually circulated about the bearing parts of the shaft for absorbing the heat generated by friction, the shaft near the bearings is considerably cooler than the rest of apparatus. Hence, the reactants which become adhered to this part solidify and become foreign matter mixed with the normal reactants. This foreign matter is easily mixed in the reactants at any time during operation due to shocks or the force of gravity and thus will degrade the quality of the reaction product.

Referring to the accompanying drawings, FIGS. 9–a and 9–b illustrate how the reaction product becomes stagnant in the vicinity of the outlet in the later stage polymerization apparatus. In the figures, water jacket 51 is water-cooling the bearing part 52 of shaft 3. If reaction product A were to be smoothly ejected through outlet 7, there would be no cause for trouble, but there is a tendency for products to stagnate at portion B for the reasons hereinabove noted.

To overcome this defect, it is conceivable to reduce the amount of unnecessary space in the vicinity of outlet 7 by using a dummy packing 53 or to install a means 54 for scraping off the adhering material. In both cases, however, there are many problems from the mechanical standpoint, and it is impossible to eliminate the stagnant portion completely. It is also impossible to completely prevent its solidification and the formation of foreign matter or the mixing of such foreign matter with the product.

An object of the present invention is to provide a horizontal reaction apparatus for continuous polycondensation reaction. Another object is to provide an apparatus for producing substances of high viscosity by carrying out a polycondensation reaction continuously in such a manner that stagnation of a reaction product of high viscosity does not occur in the vicinity of the reactor outlet at which the product is to be taken out.

According to the invention there is provided an apparatus for use in the continuous production of polycondensation products or high viscosity, such apparatus comprises a substantially horizontal reaction tank provided with an inlet near each end for the feeding of the reaction starting material and an outlet about the middle of the tank for taking out the high viscosity reaction product and a suction port for the removal by the application of vacuum of substances which are produced as by-products of the polycondensation reaction, at least one shaft journalled at positions remote from the outlet for rotation about a horizontal axis within the tank, and agitating and conveying means for conveying reaction components from the inlets to the outlet while agitating the reaction components, said means being mounted on said shaft for rotation therewith, said shaft being mounted in the tank so as to provide substantial clearance between the inner surface of the tank and said means over at least a portion of the inner periphery of the tank where said suction port is located. In preferable apparatuses, the suction port is provided at the ceiling of the reaction tank, especially at the ceiling of about the center of said tank, accordingly, the shaft is mounted in the tank so as to provide substantial clearance between the ceiling of the tank and the agitating and conveying means on the shaft.

Said agitating and conveying means on the shaft may be a screw vane of opposite pitch on either side of the middle of the shaft so as to be adapted to convey reaction components in opposite directions from the inlets to the centrally disposed outlet.

Referring to the accompanying drawings, FIG. 1 is a front elevation in longitudinal section illustrating an exemplary embodiment of the continuous polymerization apparatus according to the invention;

Figure 1:
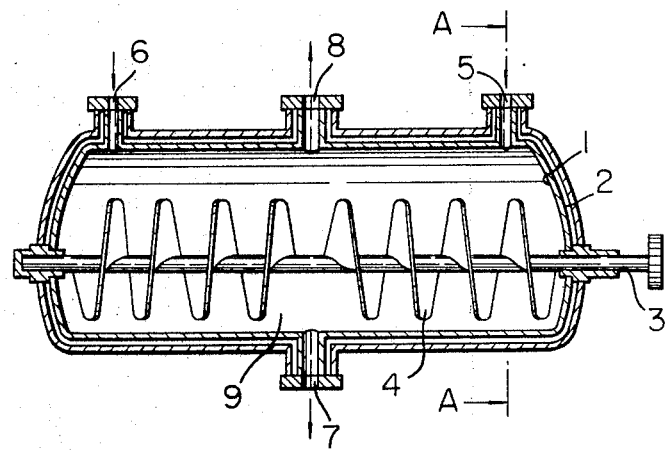
Figure 9A:
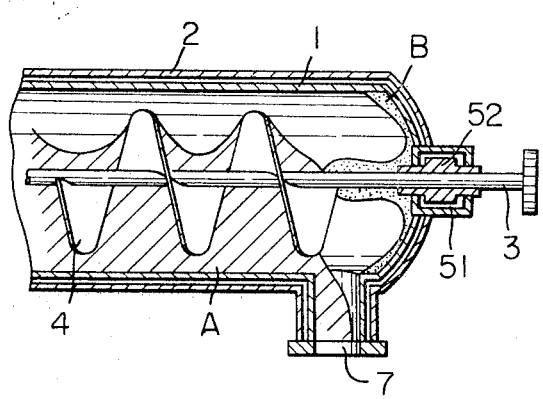
Figure 9B:
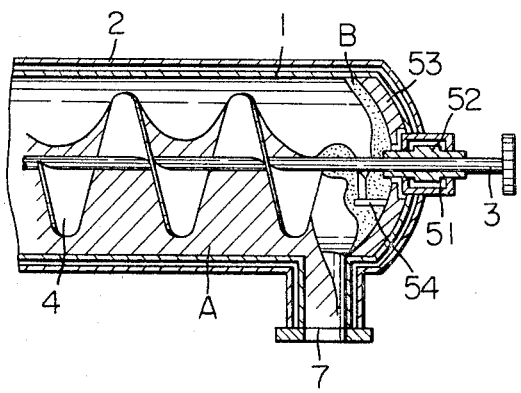
Figure 9C:
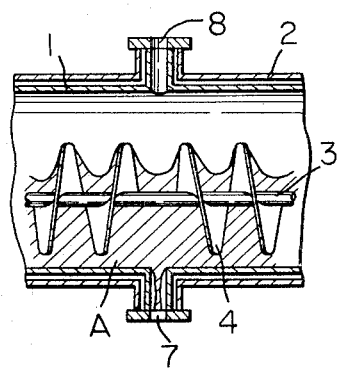

FIG. 9-c is a sectional view of part of the apparatus of FIG. 1 showing polymer being discharged therefrom.

Figure 2:
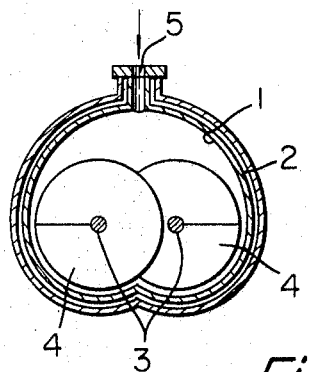
FIG. 2 is a sectional view taken along line A—A of FIG. 1.

Referring to FIGS. 1 and 2, the apparatus comprises a substantially cylindrical main reaction tank body 1. The axis of main body 1 extends substantially horizontally with its bottom being shaped to conform with two screws 4 and is surrounded by a heating jacket 2. The screw vanes 4 are fixed on rotatable shafts 3 which are journalled side-by-side in the main body 1 by bearings provided exteriorly in each end of the main body 1. Each screw vane 4 is of opposite pitch on either side of the middle of the shaft. Thus during use of the apparatus reactants are conveyed towards the middle of the main body 1 while being agitated by the vanes. It is not essential that the pitch of the screw vanes 4 be constant. The pitch in the vicinity of outlet 7 at the middle of the main body 1 can be greater than that in the vicinities of inlets 5 and 6 near each end of the main body. Inlets 5 and 6 are for feeding the low polymer, and from these two feed inlets the starting materials are fed concurrently. The polymer obtained by the reaction is continuously discharged from the outlet 7. A short pipe 8 provided at the top of the apparatus connects with a vacuum apparatus and an apparatus for separating the by-products.

When this apparatus was employed, there was a complete disappearance of the stagnation of the polymer which took place heretofore at outlet 7, this lack of stagnation being shown in FIG. 9-c, and as a result, polymer of uniform quality with very little discoloration was obtained.

Figure 4:
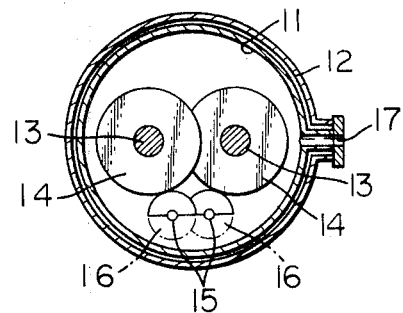
FIG. 4 is a sectional view taken along line B—B of FIG. 3.
Figure 3:
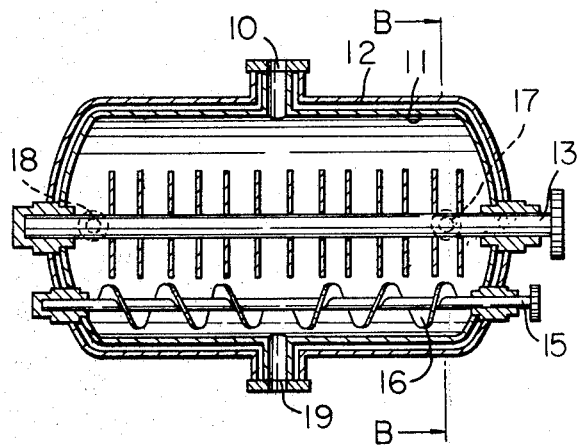
FIG. 3 is a front elevation in longitudinal section showing another embodiment of the invention.
Figure 5:
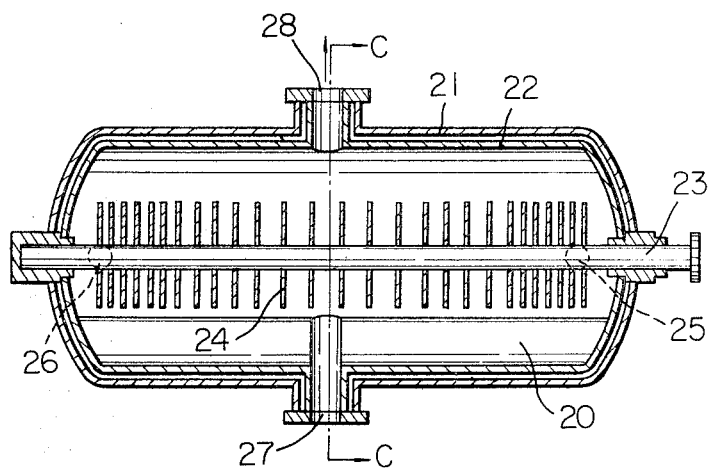
FIG. 5 is a front elevation in longitudinal section showing still another embodiment of the invention.
Figure 6:
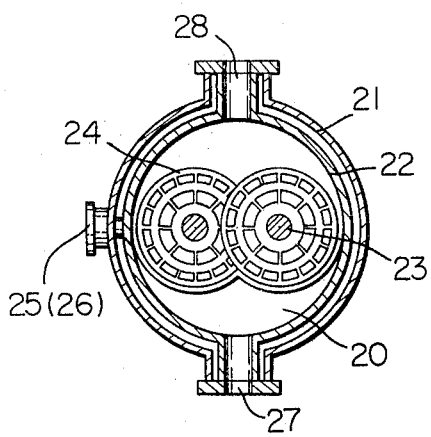
FIG. 6 is a sectional view taken along line C—C of FIG. 5.
Figure 7:
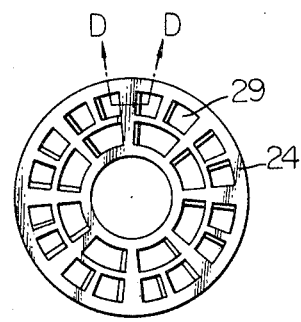
FIG. 7 is an enlarged plan view of an agitating and conveying plate employed in the apparatus illustrated in FIG. 5 and 6.
Figure 8:
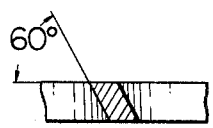
FIG. 8 is a sectional view taken along line D—D of FIG. 7.

FIGS. 3 and 4 illustrate another embodiment of the invention in which a cylindrical, horizontally extending main body 11 has a heating jacket 12 whereby its interior can be heated. In addition to agitating and conveying means comprising screws 16 mounted on shafts 15 the apparatus is provided with an additional pair of rotating shafts 13 each carrying a plurality of agitating means in the form of plates 14. Each screw 16 is of opposite pitch to the left and right of the center of the rotatable shaft 15. Thus the screws 16 are adapted to convey reactants from the ends of the main body towards the middle. The starting material is fed into the reaction body 11 through inlets 17 and 18 and the reaction product is discharged from outlet 19. A short pipe 10 provided at the top of the apparatus connects with a vacuum apparatus and an apparatus for separating the by-products.

The agitating and conveying means on the shaft may be a plurality of discs or plates mounted concentrically on said shaft for rotation therewith, said discs or plates having a plurality of oppositely tapered openings bored therethrough on either side of the middle of the shaft so as to be adapted to convey reaction components in opposite directions from the inlets to the centrally disposed outlet. The use of such bored discs or plates is illustrated in FIGS. 5 to 8. In these figures, a cylindrical, horizontally extending main body 22 has a heating jacket 21 whereby its interior is heated. The body 21 has at its bottom a dummy packing 20 whose shape is in conformity with shapes of plates 24. A plurality of plates are fixedly mounted on rotatable shafts 23 which are journalled side-by-side in the body 21 by bearings provided exteriorly in each end of the body 21. In the figure circular plates are illustrated, however, shapes of plates need not be circular, but they may be oval also. Each plate has a plurality of tapered openings 29 bored therethrough. The term "tapered" as herein referred to means that a surface defining an opening by penetrating periphery of the opening, i.e., plate has an inclined part, namely, a part not perpendicular to the surface of the plate, at least a part of said inclined part extends along a direction of radius of said plate. An angle of the inclination is preferably between 40° and 70°. Plates mounted on the right hand side of the central part of each shaft and plates mounted on the left hand side of the same have oppositely tapered openings.

Thus said plates are adapted to convey reactants from the ends of the main body towards the middle. The starting material is fed into the reaction body 21 through inlets 25 and 26 each of which is provided near each and of the body 21. The reaction product formed is discharged from outlet 27 located about the middle of the reaction body.

Between the ceiling of the reaction body 21 and plates 24, there is a substantial clearance and volatile product split off during the polycondensation reaction, for example, glycol is sucked from said clearance via the suction port 28 provided at the ceiling of the main body and removed.

FIG. 9-c illustrates the state the vicinity of outlet 7 of the invention apparatus. As shown in the figure, the flow of the reactants in the apparatus occurs from two directions, and as the reaction product is thoroughly mixed in the vicinity of the outlet, no stagnant portions occur. In addition, even though there should occur the adherence of the reactants to the shaft of the agitating and conveying means in the vicinity of the outlet, the reactants do not solidify since this part of the shaft need not be cooled as it is removed from the bearing part. Thus the discharge of the reaction product is smoothly carried out in its molten state. The employment of this apparatus in the continuous polycondensation reaction makes it possible to obtain uniform quality polymers not containing foreign matter.

Although the hereinbefore described apapratus of the invention is useful generally as a reaction apparatus for producing substances of high viscosity, it is utilized especially in the continuous production of polyethylene terephthalate or the linear terephthalate polyester polycondensation products predominantly comprising polyethylene terephthalate. Its effects are particularly marked when producing polymers having a melt viscosity of above 500 poises.

EXAMPLE 1

Bis-2-hydroxyethyl terephthalate which had undergone preliminary condensation to a low viscosity was fed over a period of 15 days into the apparatus as shown in FIGS. 1 and 2 and there the production of polyethylene terephthalate was carried out at the rate of 80 kg./day. The reaction conditions were: a reaction temperature of 280° C., a vacuum of 5 mm. Hg, a rotation of 25 r.p.m. for the agitating vane and a reaction time of 4 hours. Sampling of the polymer obtained was carried out once every 4 hours and the samples had an average intrinsic viscosity measured in ortho-chlorophenol at 25° C. of 0.67 and the standard deviation of the intrinsic viscosity was 0.002. The color-tone of the samples averaged a Hazen Number of 25 and the standard deviation was 1.5. The admixture of foreign matter above 4 microns could not be observed at all.

When the production of polyethylene terephthalate was carried out for 14 days at the rate of 700 kg./day under identical conditions as in Example 1, except that the apparatus used was a horizontal reaction tank having a starting material feed inlet at one end and an outlet for taking out the polymer at the other, the samples of polymer obtained had an average intrinsic viscosity of 0.66 and the standard deviation of the intrinsic viscosity being 0.01. The color-tone of the polymer samples average a Hazen Number of 60 and the standard deviation was 5. In this operation it was noted that foreign matter larger than 4 microns appeared mixed in the product for 5–8 hours at the rate of once in every 20–30 hours.

EXAMPLE 2

The production of polyethylene terephthalate from the same starting material as used in Example 1 was carried out for 28 days at the rate of 650 kg./day in the apparatus shown in FIGS. 3 and 4. The reaction conditions were: a reaction temperature of 285° C., a vacuum of 6 mm. Hg, a rotation of the shafts 13 of 40 r.p.m. and a reaction time of 3 hours. Samples of polymer obtained had an average intrinsic viscosity measured in ortho-chlorophenol at 25° C. of 0.64, the standard deviation of the intrinsic viscosity being 0.001 (sampling being made once in 3 hours). The color-tone of the samples averaged a Hazen Number of 23, the standard of deviation being 1.8. No admixture of foreign matter larger than 3 microns was noted at all.

What is claimed is:

1. Apparatus for use in the continuous production of polycondensation products of high viscosity, which comprises a substantilly horizontal reaction tank provided with a heating means for heating the contents thereof and with an inlet near each end for the feeding of the reaction starting material and an outlet near the middle of the tank for taking out the high viscosity reaction product and a suction port for the removal by the application of vacuum of substances which are produced as by-products of the polycondensation reaction, at least one shaft journalled at positions remote from the outlet for rotation about a horizontal axis within the tank, and agitating and conveying means for conveying reaction components from the inlets to the outlet while agitating the reaction components, said means being mounted on said shaft for rotation therewith, wherein the vertical distance from the axis of said agitator-conveyor means to the topmost portion of said reaction tank is greater than the vertical distance from said axis to the bottommost portion of said agitator-conveyor means so as to provide a by-product collection space above said agitation-conveyor means in communication with said suction port.

2. Apparatus according to claim 1, wherein said agitating and conveying means comprises a screw vane mounted on said shaft for rotation therewith, said screw vane being of opposite pitch on either side of the middle of the shaft so as to be adapted to convey reaction components in opposite directions from the inlets to the centrally disposed outlet.

3. Apparatus according to claim 2, wherein a pair of side-by-side screw vane carrying shafts are provided in the reaction tank.

4. Apparatus according to claim 3, wherein in addition to the screw vane carrying shafts, an additional pair of rotatable shafts each carrying agitating means thereon are provided, said additional pair of rotatable shafts being disposed generally parallel to and above said screw-vane carrying shafts in said reactor tank.

5. Apparatus according to claim 1, wherein said agitating and conveying means comprises a plurality of discs mounted concentrically on said shaft for rotation therewith, said discs having a plurailty of oppositely tapered openings bored therethrough on either side of the middle of the shaft so as to be adapted to convey reaction components in opposite directions from the inlets to the centrally disposed outlet.

6. Apparatus according to claim 5, wherein a plurality of side-by-side discs carrying shafts are provided in the reaction tank.

References Cited
UNITED STATES PATENTS

| | | | |
|---|---|---|---|
| 3,115,675 | 12/1963 | Tedder | 18—12 |
| 3,224,739 | 12/1965 | Schuur | 259—4 |
| 3,343,922 | 9/1967 | Zimmer et al. | 23—285 |

JAMES H. TAYMAN, Jr., Primary Examiner

U.S. Cl. X.R.

23—252, 290.5; 259—97, 4.9; 260—94.7, 78, 95